United States Patent
Gunji

(10) Patent No.: US 8,013,564 B2
(45) Date of Patent: Sep. 6, 2011

(54) MULTI-PHASE AC MOTOR DRIVING DEVICE

(75) Inventor: Keita Gunji, Ichinomiya (JP)

(73) Assignee: OMRON Corporation, Kyoto (JP)

( * ) Notice: Subject to any disclaimer, the term of this patent is extended or adjusted under 35 U.S.C. 154(b) by 575 days.

(21) Appl. No.: 12/206,260

(22) Filed: Sep. 8, 2008

(65) Prior Publication Data

US 2009/0066286 A1   Mar. 12, 2009

(30) Foreign Application Priority Data

Sep. 12, 2007   (JP) .................................. 2007-236126

(51) Int. Cl.
    *H02P 27/04*   (2006.01)
(52) U.S. Cl. ......... 318/801; 318/802; 318/717; 318/718
(58) Field of Classification Search .................. 318/801, 318/802, 717, 718
    See application file for complete search history.

(56) References Cited

U.S. PATENT DOCUMENTS

| | | | | |
|---|---|---|---|---|
| 5,214,575 A * | 5/1993 | Sugishima et al. | ............. | 363/37 |
| 5,280,228 A * | 1/1994 | Kanouda et al. | ............. | 318/803 |
| 7,136,269 B2 * | 11/2006 | Iimura et al. | ................. | 361/93.7 |
| 7,586,285 B2 * | 9/2009 | Gunji | ............................. | 318/717 |
| 7,609,498 B2 * | 10/2009 | Iimura et al. | ................. | 361/93.7 |
| 7,626,838 B2 * | 12/2009 | Gunji | ......................... | 363/56.04 |
| 2005/0093505 A1 | 5/2005 | Kameya | | |
| 2007/0165431 A1 | 7/2007 | Gunji | | |

FOREIGN PATENT DOCUMENTS

| | | |
|---|---|---|
| CA | 2038846 A1 | 9/1991 |
| DE | 40 09 184 A1 | 9/1991 |
| DE | 103 03 267 A1 | 7/2003 |
| EP | 1 508 497 A1 | 2/2005 |
| EP | 1 612 924 A2 | 1/2006 |
| JP | 06-253585 A | 9/1994 |
| JP | 2002-204593 A | 7/2002 |
| JP | 2003-164159 A | 6/2003 |
| JP | 2005-143153 A | 6/2005 |
| JP | 2007-189825 A | 7/2007 |

OTHER PUBLICATIONS

European Search Report for European Application No. 08159431.9-2207 dated Jan. 27, 2009, 8 pages.
English abstract of DE10303267 (A1) published on Jul. 31, 2003, espacenet database, 1 page.
Patent Abstracts of Japan, Publication No. 2002204593, Publication Date: Jul. 19, 2002, 1 page.
Patent Abstracts of Japan, Publication No. 06-253585, Publication Date: Sep. 9, 1994, 1 page.

* cited by examiner

*Primary Examiner* — Bentsu Ro
*Assistant Examiner* — Erick Glass
(74) *Attorney, Agent, or Firm* — Osha • Liang LLP

(57) ABSTRACT

A multi-phase AC motor driving device in which occurrence of failure is not erroneously determined is provided. In a multi-phase AC motor driving device including an inverter circuit; current detecting resistances Ru, Rv, and Rw, respectively arranged on lower arm of the respective phase of the inverter circuit, for detecting phase current of the motor; and a control portion and a PWM circuit for controlling ON/OFF operation of switching devices of the inverter circuit, the determination on the occurrence of failure based on the current values detected by the current detecting resistances is not made if relays connected between the inverter circuit and the motor are turned ON and all the switching devices of the lower arms of the respective phases are turned OFF.

6 Claims, 9 Drawing Sheets

MULTI-PHASE AC MOTOR DRIVING DEVICE

BACKGROUND OF THE INVENTION

1. Field of the Invention

The present invention relates to multiphase alternating current (AC) motor driving devices for driving a multiphase AC motor with an inverter circuit, in particular, to a multiphase AC motor driving device for determining the occurrence of failure based on the detection results of the current values of the respective phases.

2. Description of the Related Art

An electric power steering device in a vehicle is provided with an AC motor such as a three-phase brushless motor in order to apply to a steering mechanism a steering aiding force corresponding to a steering torque of a handle. A motor drive unit includes a PWM (Pulse Width Modulation) circuit for generating PWM signals having a duty ratio corresponding to the command value and an inverter circuit including pairs of upper and lower switching devices, which are turned ON/OFF according to the duty ratio of the PWM signal output from the PWM circuit, provided for respective phases. The inverter circuit outputs voltage for the respective phases corresponding to the aforementioned duty ratio based on the ON/OFF operations of the switching devices, to drive the motor with the voltages. The currents in the respective phases of the motor are detected by a current detection resistance connected in series with the switching device, and the detected value is the value of the current actually flowing through the motor.

Japanese Laid-Open Patent Publication No. 2005-143153, No. H6-253585 to No. 2007-189825 described below disclose a multiphase AC motor driving device using the inverter circuit. In the device of Japanese Laid-Open Patent Publication No. 2005-143153, an estimated value of the current flowing through the inverter circuit is calculated based on an application voltage and a resistance value between a power supply and a motor, and an actual current value detected in an actual current detecting section and the estimated current value are compared to detect abnormality in the values of the currents flowing through the respective phases. In the device of Japanese Laid-Open Patent Publication No. H6-253585, using the fact that the sum of the current values of the respective phases of the three-phase AC motor is zero, determination is made as abnormal when the sum of the detected current values of the respective phases is not zero. In the device of Japanese Laid-Open Patent Publication No. 2007-189825, the phase currents flowing through the reflux diodes connected in parallel to the switching devices are detected during a dead time period in which the upper and lower switching devices of the inverter circuit are both turned OFF to lengthen the sampling period and enable motor control with high accuracy.

In the motor driving device using the inverter circuit as described above, the sum of the currents of the respective phases of the motor is known to be zero, and thus the occurrence of failure of the motor driving device or the motor can be determined by detecting the currents of the respective phases and determining whether the sum is zero as in Japanese Laid-Open Patent Publication No. H6-253585.

However, if the motor rotates by external force when all the switching devices of the inverter circuit are turned OFF, that is, when the motor driving device is not driving the motor, induction voltage generates in the motor and currents flow through the inverter circuit. As a result, the sum of the current values of the respective phases detected by the current detection resistances does not become zero, and erroneous determination that failure has occurred is made. This will be specifically described in FIG. 9.

FIG. 9 shows a motor driving device shown in FIG. 1 of Japanese Laid-Open Patent Publication No. 2007-189825. The motor driving device includes a control portion 1, a PWM circuit 2, an inverter circuit 3, sample-and-hold circuits 5u to 5w, and direct current (DC) amplification circuits 6u to 6w. The inverter circuit 3 includes pairs of upper and lower arms provided in association with respective phases, the respective arms being configured by switching devices Q1 to Q6, and reflux diodes D1 to D6 connected in parallel thereto. A PWM signal is individually provided from the PWM circuit 2 to the respective gates of the switching devices Q1 to Q6, and the switching devices Q1 to Q6 are turned ON in an ON zone of the PWM signal and are turned OFF in an OFF zone of the PWM signal. Through the ON/OFF operation of the switching devices Q1 to Q6, a U-phase voltage, a V-phase voltage, and a W-phase voltage for the motor drive are extracted from the connection points a, c, and e of the upper and lower arms of the respective phase and are supplied to the three-phase AC motor 4.

Ru, Rv, and Rw are current detection resistances for detecting the phase current of the motor 41 and the voltage generated across the opposite ends of each resistance Ru to Rw (electric potential at points b, d, f) is input to the respective sample-and-hold circuit 5u to 5w. The sample-and-hold circuits 5u to 5w include switches Su to Sw, condensers Cu to Cw, and differential amplifiers Au to Aw. The sampled and held voltage is amplified in the DC amplification circuits 6u to 6w, and output as phase currents Iu to Iw. The control portion 1 is input with a torque value, a vehicle speed value, and a phase current detection value, and outputs a command voltage and a sampling signal. The command voltages Vu to Vw are supplied to the PWM circuit 2, and the sampling signals SPu to SPw are provided to the sample-and-hold circuits 5u to 5w.

In the circuit of FIG. 9, the switching devices Q1 to Q6 are turned OFF if the motor 4 is not driven by the inverter circuit 3. If external force is applied to the motor 4 in this state, the motor 4 rotates by the external force and induction voltage is generated at windings 4u to 4w of the motor 4. Due to such induction voltage, current indicated by a broken line in the figure flows through the inverter circuit 3 in the direction of the arrow. As a result, current, which originally does not flow, flows through the current detection resistances Rv and Rw, and the V-phase current Iv and the W-phase current Iw of the motor 4 are detected through the sample-and-hold circuits 5v, 5w and the DC amplification circuits 6v, 6w. Thus the sum Iu+Iv+Iw of the current values of the respective phases does not become zero, and the control portion 1 determines that failure has occurred. The sum of the currents does not become zero because external force is applied on the motor 4 and induction voltage is generated, and not because abnormality is found in the motor 4 and the drive circuit, and thus the determination is an erroneous determination.

A case where all the switching devices Q1 to Q6 are turned OFF includes a case where the inverter circuit 3 starts activation, a case where all the PWM signals are Low during the drive of the inverter circuit 3, and the like. The former is when all the switching devices Q1 to Q6 are turned OFF while the ignition switch of the vehicle is turned ON and initial diagnosis operation is being performed. The latter is a case when all the switching devices Q1 to Q6 are turned OFF as a result of having all the PWM signals to Low to prevent destruction of the element when the application voltage of the switching devices Q1 to Q6 exceeds a predetermined value during the operation of the inverter circuit 3.

All the switching devices Q1, Q3, Q5 on the upper side are turned ON and all the switching devices Q2, Q4, Q6 on the lower side are turned OFF to apply breaking at a maximum force when applying a regenerative breaking on the motor 4 while the inverter circuit 3 is operating, but since the currents flow through the current detection resistances due to the generated induction voltage if external force is applied on the motor 4 even when only the switching devices Q2, Q4, Q6 on the lower side are all turned OFF, the problem of erroneous determination described above arises.

In the conventional device, when induction voltage is generated in the motor in a state all the switching devices on the lower side of the inverter circuit are at least turned OFF, that is, in a state the phase currents of the motor cannot be normally detected, determination is erroneously made that failure has occurred when actually failure has not occurred.

It is an object of the present invention to provide a multiphase AC motor driving device which does not make an erroneous determination on the occurrence of failure.

SUMMARY OF THE INVENTION

A multi-phase AC motor driving device that serves as a basis of the present invention includes an inverter circuit for driving a motor; a current detecting section for detecting a phase current of the motor; a control section for controlling a switching device of the inverter circuit; and a first determining section for determining occurrence of a failure. The inverter circuit includes pairs of upper and lower arms provided in association with respective phases of a motor, the inverter circuit being constituted such that the respective arm has a switching device for driving a multi-phase AC motor and a reflux diode connected in parallel to the device, and a voltage for driving the motor is extracted from a connection point of the upper and lower arms of the respective phases. The current detecting section, arranged in the lower arm of the respective phases of the inverter circuit, detects a phase current of the motor. The control section controls ON/OFF operation of each switching device of the inverter circuit. The first determining section determines occurrence of a failure based on a current value detected by the current detecting section.

According to the present invention, in the multi-phase AC motor driving device described above, a second determining section for determining whether or not there is a possibility current flows through the current detecting section due to an induction voltage generated in the multi-phase AC motor is arranged. The first determining section does not make a determination on the occurrence of the failure if the second determining section determines that there is possibility that current flows and if all the switching devices of the lower arms of the respective phases are turned OFF. The first determining section makes a determination on the occurrence of the failure if the second determining section determines that there is no possibility that current flows and if all the switching devices of the lower arms of the respective phases are turned OFF.

Accordingly, in a state all the switching devices of the lower arms of the respective phases are turned OFF, failure diagnosis based on the detected current values is not performed even if the induction voltage is generated in the motor due to external force and current flows through the inverter circuit, and such current is detected by the current detecting section, whereby erroneous determination that failure has occurred is not made, and the reliability of the device can be enhanced.

Number of methods is considered in determining the possibility that current flows by the second determining section. Determination is made that there is possibility that current flows through the current detecting section when the open/close switch connected between the inverter circuit and the multi-phase AC motor is turned ON.

Determination that there is possibility that current flows through the current detecting section may be made when the rotation speed detecting section for detecting the rotation speed of the multi-phase AC motor detects a rotation speed of greater than or equal to a predetermined value.

Alternatively, determination that there is possibility that current flows through the current detecting section may be made when the terminal voltage detecting section for detecting the terminal voltage of the multi-phase AC motor detects a terminal voltage of greater than or equal to a predetermined value.

The method of determining failure by the first determining section typically includes a method of determining the occurrence of failure based on whether or not a sum of the current values of the respective phases detected by the current detecting section is zero. In this case, determination is made that failure has not occurred if the sum of the current values of the respective phases is zero, and determination is made that failure has occurred if the sum of the current values of the respective phases is not zero.

The present invention is also effective in a multi-phase AC motor driving device for correcting the current values of the respective phases detected by the current detecting section with the offset current values set in advance. In this case, a storage section for storing a current value of an offset current of the respective phase flowing through the current detecting section is arranged. The offset current value is not stored in the storage section if determined that there is possibility that current flows and if all the switching devices of the lower arms of the respective phases are turned OFF; and the offset current value is stored in the storage section if determined that there is no possibility that current flows and if all the switching devices of the lower arms of the respective phases are turned OFF.

Accordingly, the erroneous offset current values caused by the induction voltage of the motor are not stored in the storage section, and the offset correction of the detected currents can be accurately performed, whereby erroneous determination on the occurrence of failure can be avoided.

According to the present invention, erroneous determination that failure has occurred is not made even if current flows through the inverter circuit by the induction voltage of the motor, and the reliability of the device can be enhanced.

DETAILED DESCRIPTION OF THE PREFERRED EMBODIMENTS

Figure 1:
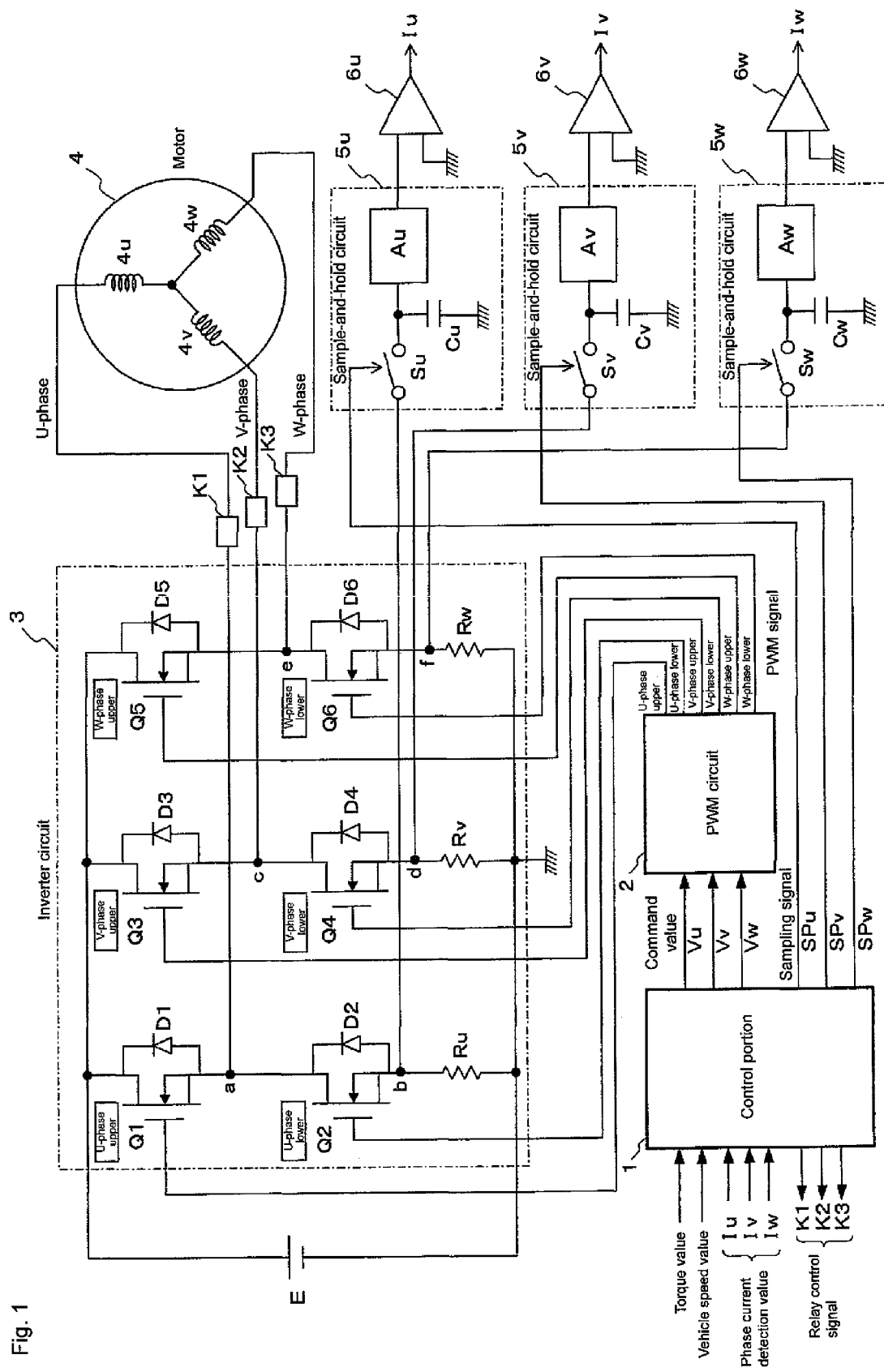
FIG. 1 shows a view of an electrical structure of a multi-phase AC motor according to a first embodiment of the present invention.
Figure 9:
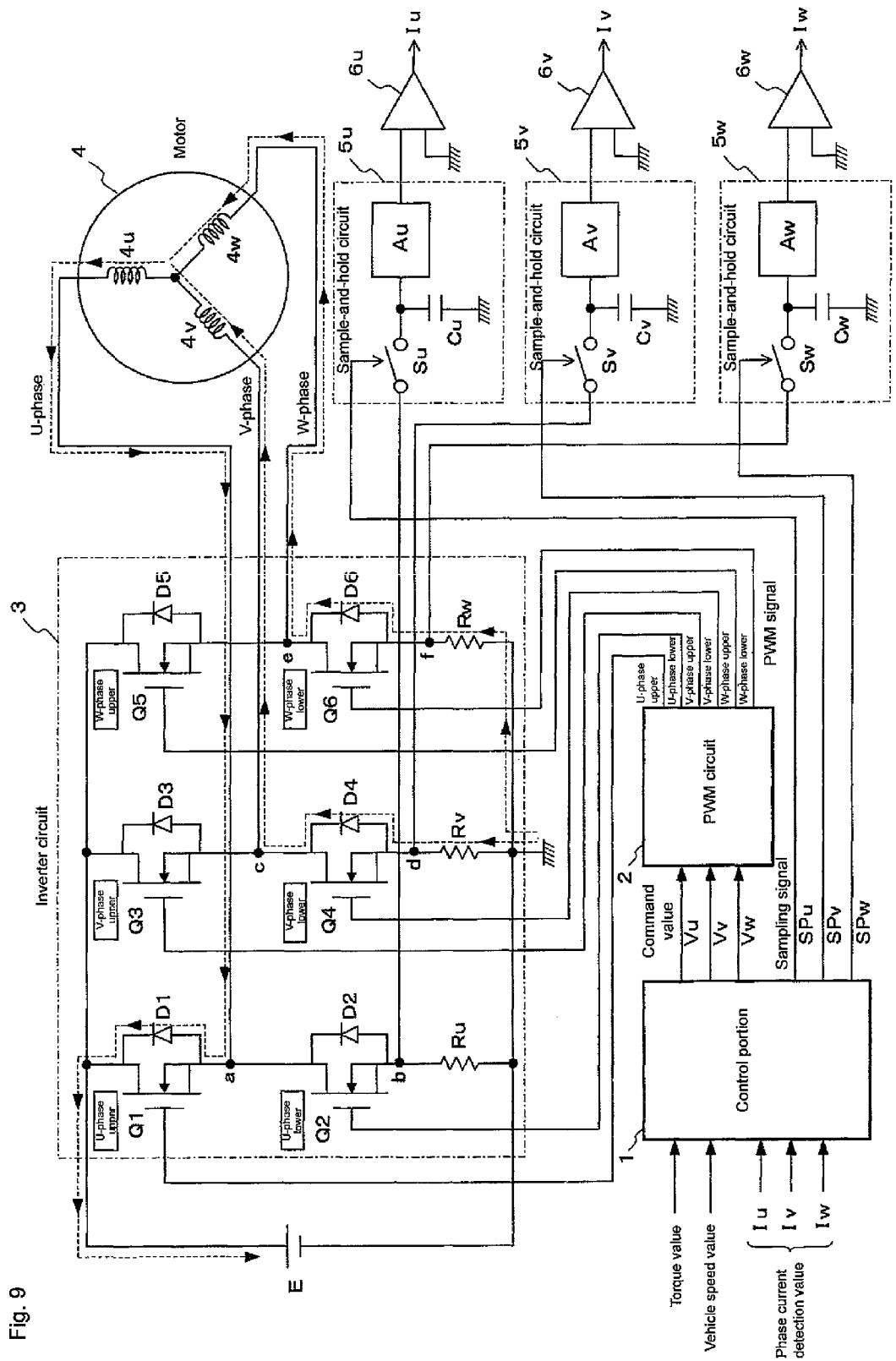
FIG. 9 shows a view of an electrical structure of a conventional multiphase AC motor driving device.

FIG. 1 shows a view of an electrical structure of a multi-phase AC motor driving device according to a first embodiment of the present invention. In FIG. 1, same reference numerals are denoted for the same portions as in FIG. 9. The electrical structure of a multi-phase AC motor driving device includes; a control portion 1 constituted by a CPU, a memory and the like; a known PWM circuit 2 which outputs PWM signals having predetermined duty ratios based on command voltages Vu to Vw from the control portion 1; an inverter circuit 3 which outputs motor-driving three-phase voltages (U-phase voltage, V-phase voltage, W-phase voltage) based on the PWM signals from the PWM circuit 2; a three-phase AC motor 4 (hereinafter simply referred to as "motor") driven by the three-phase voltages output from the inverter circuit 3; windings 4u, 4v, and 4w of the respective phase of the motor 4; sample-and-hold circuits 5u, 5v, and 5w which sample voltages for detecting the phase currents over a predetermined period and holds the samples; DC amplification circuits 6u, 6v, and 6w which amplify the outputs of the sample-and-hold circuits 5u, 5v, and 5w; relays K1, K2, and K3 connected between the inverter circuit 3 and the motor 4. A large current open/close switch may be used in place of the relay. The control portion 1, the PWM circuit 2, the inverter circuit 3, the sample-and-hold circuits 5u, 5v, and 5w, the DC amplification circuits 6u, 6v, and 6w, and the relays K1, K2, and K3 configure the motor driving device.

The inverter circuit 3 is connected between a positive electrode and a negative electrode (ground) of the battery E and converts the DC voltage of the battery E into an AC voltage. This inverter circuit 3 is a known circuit, and includes pairs of upper and lower arms provided in association with the U-phase, the V-phase, and the W-phase, the respective arms including switching devices Q1 to Q6, and reflux diodes D1 to D6 connected in parallel to the respective switching devices. The switching devices Q1 to Q6 are constituted by MOS FETs (Field Effect Transistors), but instead thereof, IGBTs (Insulated Gate Bipolar Mode Transistor) or other devices can be employed. The respective gates of the switching device Q1 to Q6 are individually provided with six types of PWM signals (U-phase upper, U-phase lower, V-phase upper, V-phase lower, W-phase upper, W-phase lower) from the PWM circuit 2. During the ON (High) periods of the PWM signals, the switching devices Q1 to Q6 are turned ON (conduction state), while during the OFF (Low) periods of the PWM signals the switching devices Q1 to Q6 are turned OFF (cut-off state).

Through the ON/OFF operations of the switching devices Q1 to Q6, the U-phase voltage, the V-phase voltage, and the W-phase voltage for driving the motor are extracted from the connection points a, c, and e between the upper and lower arms of the respective phases in the inverter circuit 3 and are supplied to the motor 4. Namely, the U-phase voltage is extracted from the connection point a between the switching devices Q1, Q2 and is supplied to the U-phase winding 4u of the motor 4 through the relay K1. The V-phase voltage is extracted from the connection point c between the switching devices Q3, Q4 and is supplied to the V-phase winding 4v of the motor 4 through the relay K2. The W-phase voltage is extracted from the connection point e between the switching devices Q5, Q6 and is supplied to the W-phase winding 4w of the motor 4 through the relay K3. The motor 4 is constituted by, for example, a three-phase brushless motor.

There are provided current detection resistances Ru, Rv, and Rw for detecting the phase currents of the motor 4 on the lower arms of the respective phases in the inverter circuit 3. The current detection resistance Ru is connected in series with the switching devices Q1, Q2, and the voltage generated across the opposite ends of the resistance Ru (electric potential at point b) is input to the sample-and-hold circuit 5u. The current detection resistance Rv is connected in series with the switching devices Q3, Q4, and the voltage generated across opposite ends of the resistance Rv (electric potential at point d) is input to the sample-and-hold circuit 5v. The current detection circuit Rw is connected in series with the switching devices Q5, Q6, and the voltage generated across opposite ends of the resistance Rw (electric potential at point f) is input to the sample-and-hold circuit 5w.

The sample-and-hold circuits 5u, 5v, and 5w include switches Su, Sv, Sw; condensers Cu, Cv, Cw; and differential amplifiers Au, Av, Aw. When currents flow through the current detection resistances Ru, Rv, and Rw in the inverter circuit 3, and, thus, the voltages to be detected are generated between the opposite ends of the resistances, the switches Su, Sv, and Sw are set to ON through sampling signals SPu, SPv, SPw from the control portion 1, and the voltages to be detected are sampled in such a way that they charge the condensers Cu, Cv, Cw through the switches Su, Sv, and Sw being turned ON. Thereafter, when currents no longer flow through the current detection resistances Ru, Rv, Rw, and there is a necessity to hold the sampled voltage, the switches Su, Sv, Sw are turned OFF to maintain the voltages charged at the condensers Cu, Cv, and Cw. The voltages sampled and held as described above are amplified by the DC amplification circuits 6u, 6v, and 6w to be output as phase currents Iu, Iv, and Iw. The phase currents Iu, Iv, Iw indicate the values of actual currents flowing through the respective phases of the motor 4, and are supplied to the control portion 1 as phase current detection values.

The control portion 1 calculates the currents to be flowed through the respective phases of the motor 4, that is, the target values of the motor currents for providing a required steering aiding force, based on a torque value detected by a torque sensor (not illustrated) and a vehicle speed value detected by a vehicle speed sensor (not illustrated), and makes comparison between the target values and the phase currents Iu, Iv, Iw (detected values) to determine the deviations therebetween. Then, based on the resultant deviations, the control portion 1 calculates command voltages Vu, Vv, and Vw for the respective phases which are to be supplied to the PWM circuit 2. The command voltages are parameters for performing feedback control such that currents having the target values flow through the windings 4u, 4v, and 4w of the respective phases in the motor 4. The PWM circuit 2 creates six types of PWM signals having predetermined duty ratios as described above, based on the command voltage, such that a U-phase voltage, a V-phase voltage, and a W-phase voltage corresponding to the command voltages Vu, Vv, Vw are supplied to the motor 4, and then supplies them to the respective switching device Q1 to Q6 of the inverter circuit 3. The control portion 1 outputs a relay control signal for controlling ON/OFF of each relay K1, K2, and K3.

In the above configuration, the current detection resistances Ru, Rv, Rw configure one embodiment of the current detecting section in the present invention; the control portion 1 configures one embodiment of a first determining section and a second determining section in the present invention; and the control portion 1 and the PWM circuit 2 configure one embodiment of a control section in the present invention. The relays K1, K2, and K3 configure one embodiment of an open/close switch in the present invention.

The procedure of failure diagnosis in the circuit of FIG. 1 will now be described based on the flowchart shown in FIG. 2.

In step S1, the U-phase current Iu flowing through the current detection resistance Ru is detected by the sample-and-hold circuit 5u and the DC amplification circuit 6u based on the electric potential at point b. In step S2, the V-phase current Iv flowing through the current detection resistance Rv is detected by the sample-and-hold circuit 5v and the DC amplification circuit 6v based on the electric potential at point d. In step S3, the W-phase current Iw flowing through the current detection resistance Rw is detected by the sample-and-hold circuit 5w and the DC amplification circuit 6w based on the electric potential at point f.

Thereafter, in step S4, whether or not all the switching devices Q2, Q4, and Q6 on the lower side in the inverter circuit 3 are turned OFF is determined. The ON/OFF state of the switching devices Q2, Q4, and Q6 can be judged by checking what command voltage is being applied from the control portion 1 to the PWM circuit 2 by the control portion 1 itself. If all the switching devices Q2, Q4, and Q6 on the lower side are not in the OFF state as a result of the determination in step S4 (step S4: NO), the process proceeds to a failure diagnosis process of steps S6 to S8 without executing step S5a.

In step S6, the sum I=Iu+Iv+Iw of the current values of the respective phases is calculated based on the U-phase current Iu, the V-phase current Iv, and the W-phase current Iw detected in steps S1 to S3. In the following step S7, the absolute |I| of I obtained in step S6 and a predetermined value α are compared. Since the sum of the currents of the respective phases of the motor is theoretically zero, the value of α is ideally α=0, but actually, it is a value containing slight error difference. If not |I|>α (step S7: NO) as a result of the determination in step S7, the device is judged as normally operating, and the process is terminated without executing step S8. If |I|>α as a result of the determination in step S7, the process proceeds to step S8, and the device is judged as having a failure. The control portion 1 then performs a process of stopping the operation of the motor driving device.

If all the switching devices Q2, Q4, and Q6 on the lower side are turned OFF as a result of the determination in step S4 (step S4: YES), the process proceeds to step S5a, and whether or not all the relays K1, K2, and K3 are turned OFF is determined. The ON/OFF state of the relays K1, K2, and K3 can be judged by checking what relay control signal is being output from the control portion 1 by the control portion 1 itself. If all the relays K1, K2, and K3 are turned OFF (step S5a: YES) as a result of the determination in step S5a, the failure diagnosis process of steps S6 to S8 described above is performed.

If all the relays K1, K2, and K3 are not turned OFF as a result of the determination in step S5a (step S5a: NO), the process is terminated without executing the failure diagnosis process of steps S6 to S8. This aspect is the characteristic of the first embodiment, and erroneous determination on the occurrence of failure can be avoided.

In other words, in a state all the switching devices Q2, Q4, and Q6 on the lower side are turned OFF, even when induction voltage is generated in the motor 4 due to external force, there is no possibility that currents flow through the current detection resistances Ru, Rv, and Rw based on the relevant voltage if the relays K1, K2, and K3 are turned OFF, but there is a possibility that currents based on the induction voltage flow through the current detection resistances Ru, Rv, and Rw through the relays K1, K2, and K3 when the induction voltage is generated in the motor 4 due to external force, if the relays K1, K2, and K3 are turned ON. Therefore, if the failure diagnosis process is performed in the latter case, the sum Iu+Iv+Iw of the current values of the respective phases will not become zero, as described with FIG. 9, and erroneous determination that failure has occurred might be made. The failure diagnosis based on the current values is not performed even if the currents flow through the current detection resistances Ru, Rv, and Rw if the failure diagnosis process is prohibited when the relays K1, K2, and K3 are turned ON, as described above, and thus erroneous determination that failure has occurred is not made, and the reliability of the device can be enhanced.

Figure 3:
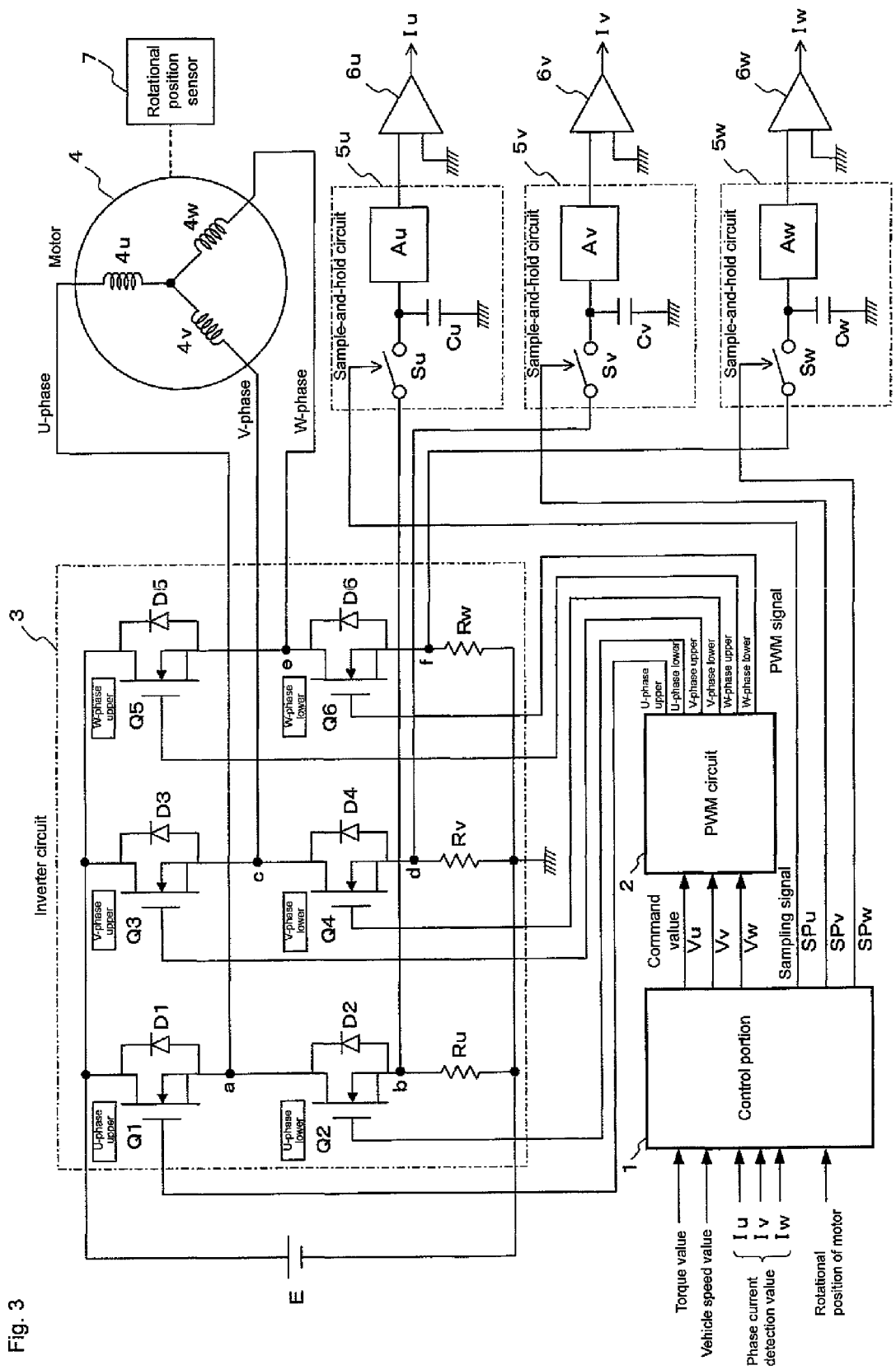
FIG. 3 shows a view of an electrical structure of a multi-phase AC motor according to a second embodiment of the present invention.

FIG. 3 is a view showing an electrical structure of a multi-phase AC motor driving device according to a second embodiment of the present invention. In FIG. 3, the same reference numerals are denoted for the same portions as in FIG. 1. In the second embodiment, a rotational position sensor 7 for detecting the rotational position (rotation angle) of the motor 4 is arranged. The rotational position sensor 7 includes a resolver, a Hall element, and the like. The information of the motor rotational position detected by the rotational position sensor 7 is input to the control portion 1, and the control portion 1 calculates the rotation speed of the motor 4 based on the rotational position. The control portion 1 and the rotational position sensor 7 configure one embodiment of a rotation speed detecting section in the present invention. The relays K1 to K3 of FIG. 1 are not arranged in FIG. 3, but the relays K1 to K3 may be added. The circuit of FIG. 3 is basically the same as FIG. 1 other than the above aspect, and thus the detailed description of each part will be omitted.

Figure 4:
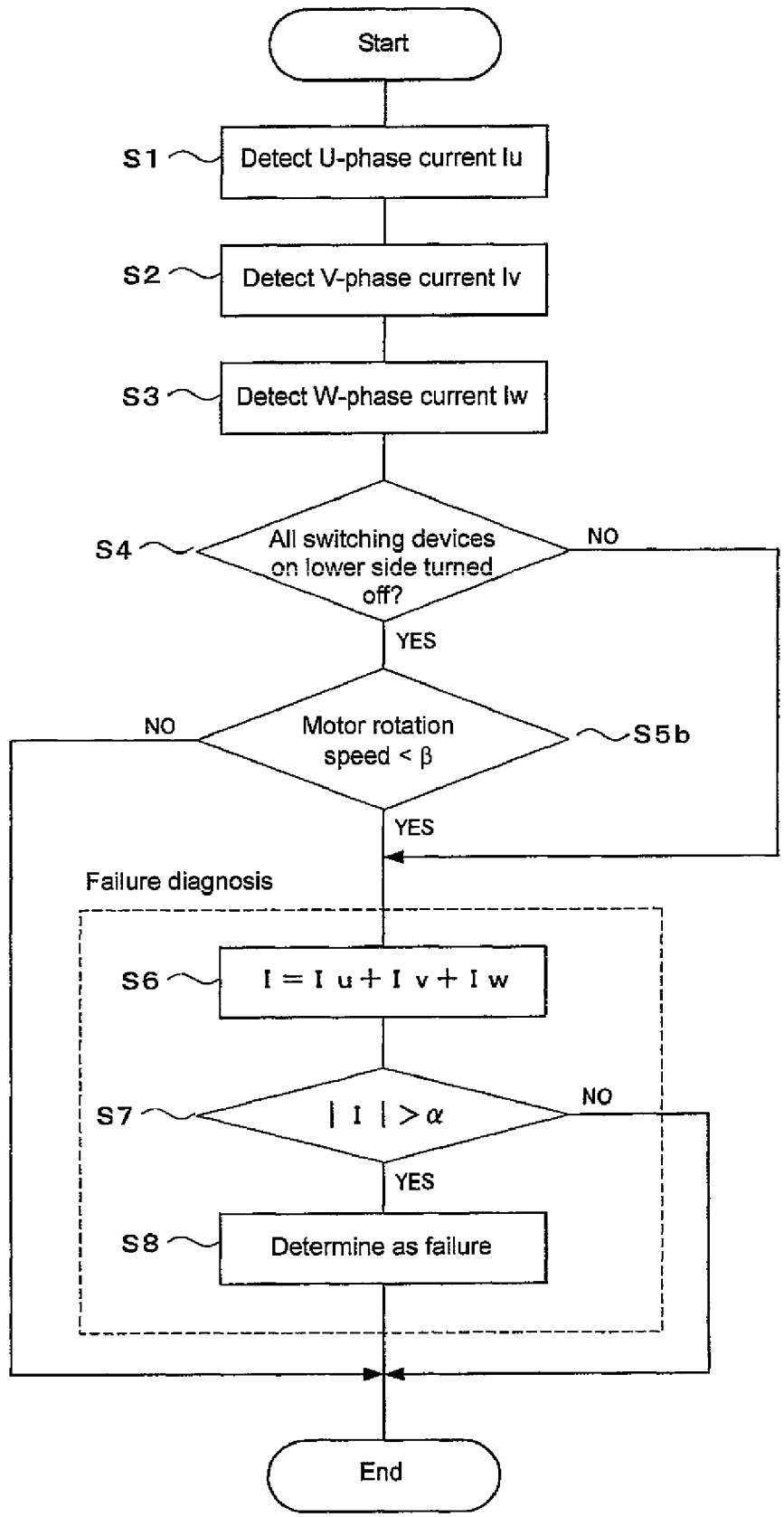
FIG. 4 shows a flowchart of a procedure of a failure diagnosis according to the second embodiment.

The procedure of the failure diagnosis in the circuit of FIG. 3 will now be described based on the flowchart shown in FIG. 4. In FIG. 4, the same reference numerals are denoted for steps performing the same process as in FIG. 2.

Figure 2:
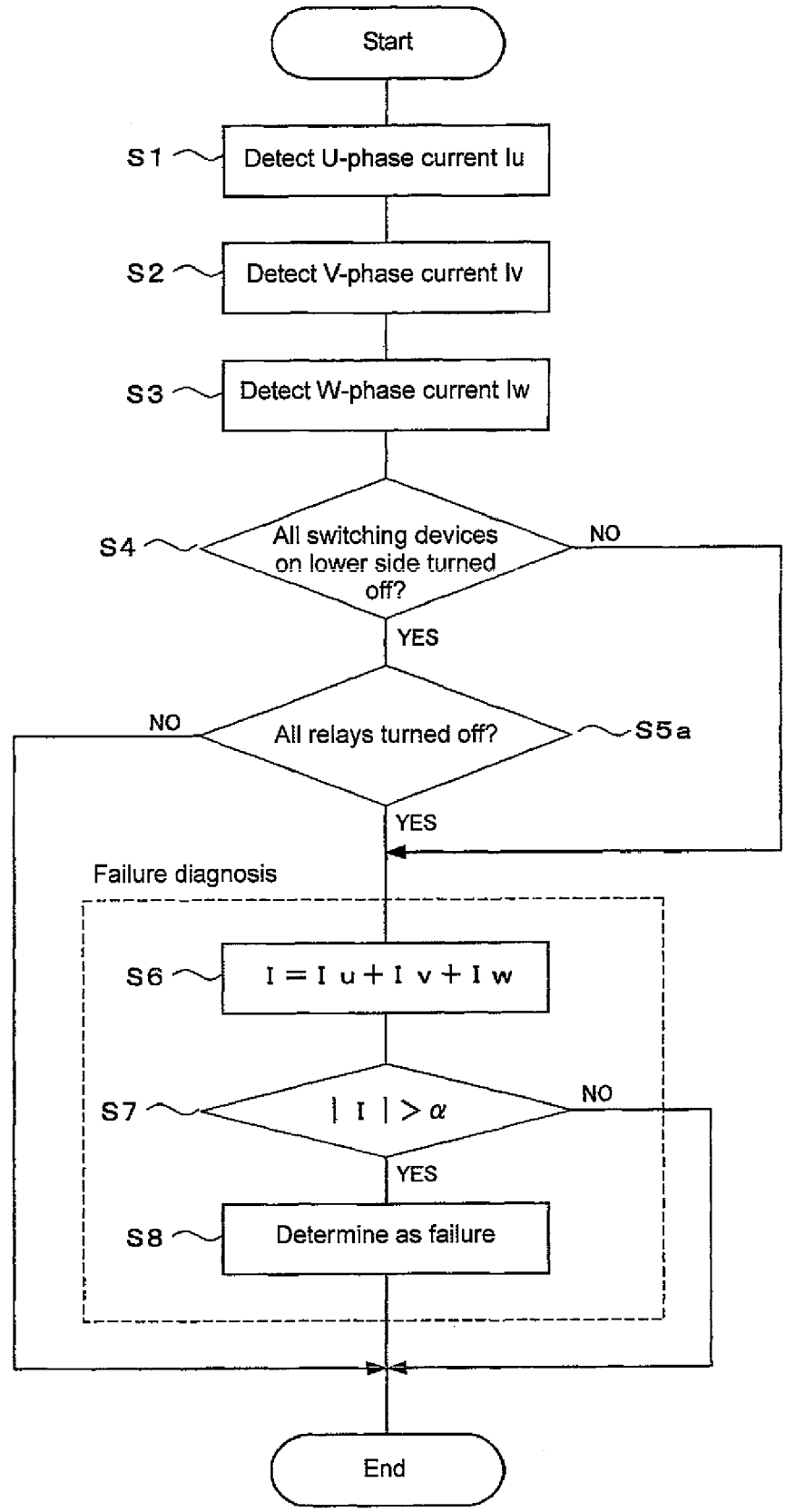
FIG. 2 shows a flowchart of a procedure of a failure diagnosis according to the first embodiment.

Steps S1 to S4 are exactly the same as FIG. 2. In other words, the U-phase current Iu flowing through the current detection resistance Ru is detected in step S1, the V-phase current Iv flowing through the current detection resistance Rv is detected in step S2, and the W-phase current Iw flowing through the current detection resistance Rw is detected in step S3.

Thereafter, the process proceeds to step S4, and whether or not all the switching devices Q2, Q4, and Q6 on the lower side in the inverter circuit 3 are turned OFF is determined. If all the switching devices Q2, Q4, and Q6 on the lower side are not in the OFF state as a result of the determination in step S4 (step S4: NO), the process proceeds to the failure diagnosis process of steps S6 to S8 described above. If all the switching devices Q2, Q4, and Q6 on the lower side are turned OFF (step S4: YES), the process proceeds to step S5b.

In step S5b, the rotation speed of the motor 4 calculated by the control portion 1 based on the rotational position detected by the rotational position sensor 7 is compared with a predetermined value β. If the rotation speed of the motor 4 is smaller than the predetermined value β (step S5b: YES), the failure diagnosis process of steps S6 to S8 is performed.

If the rotation speed of the motor 4 is greater than or equal to the predetermined value β (step S5b: NO) as a result of the determination in step S5b, the process is terminated without executing the failure diagnosis process of steps S6 to S8. This aspect is the characteristic of the second embodiment, and erroneous determination on the occurrence of failure can be avoided.

In other words, in a state all the switching devices Q2, Q4, and Q6 on the lower side are turned OFF, there is no possibility that induction voltage generates in the motor 4 due to external force, and thus there is no possibility that currents flow to the current detection resistances Ru, Rv, and Rw if the rotation speed of the motor 4 is smaller than the predetermined value, but there is a possibility that induction voltage generates in the motor 4, and the currents flow to the current detection resistances Ru, Rv, and Rw if the rotation speed of the motor 4 is greater than or equal to the predetermined value. Therefore, if the failure diagnosis process is performed in the latter case, the sum Iu+Iv+Iw of the current values of the respective phases does not become zero, as described with FIG. 9, and erroneous determination that failure has occurred might be made. The failure diagnosis based on the current values is not performed even if the currents flow to the current detection resistances Ru, Rv, and Rw if the failure diagnosis process is prohibited when the rotation speed of the motor 4 is greater than or equal to the predetermined value, as described above, and thus erroneous determination that failure has occurred is not made, and the reliability of the device can be enhanced.

Figure 5:
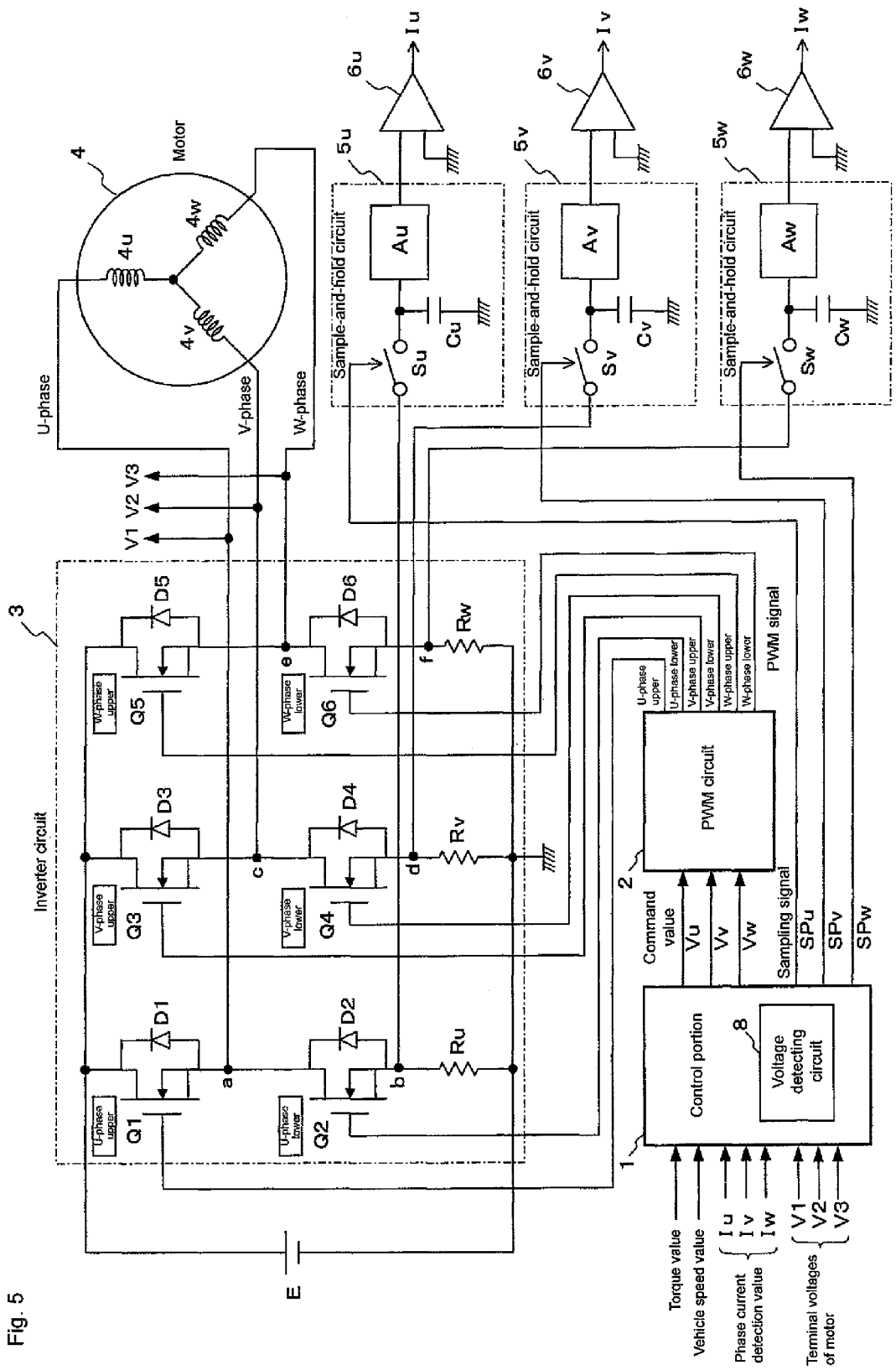
FIG. 5 shows a view of an electrical structure of a multi-phase AC motor according to a third embodiment of the present invention.

FIG. 5 is a view showing an electrical structure of a multiphase AC motor driving device according to a third embodiment of the present invention. In FIG. 5, the same reference numerals are denoted for the same portions as in FIG. 1. In the third embodiment, terminal voltages V1, V2, and V3 of the respective phases of the motor 4 are input to the control portion 1. The control portion 1 detects the motor terminal voltages V1 to V3 by a voltage detecting circuit 8 incorporated therein. The voltage detecting circuit 8 may be arranged exterior to the control portion 1. The voltage detecting circuit 8 configures one embodiment of a terminal voltage detecting section in the present invention. In FIG. 5, the relays K1 to K3 of FIG. 1, and the rotational position sensor 7 of FIG. 3 are not arranged, but may be added. The circuit of FIG. 5 is basically the same as FIG. 1 and FIG. 3 other than the above aspect, and thus the detailed description of each part will be omitted.

Figure 6:
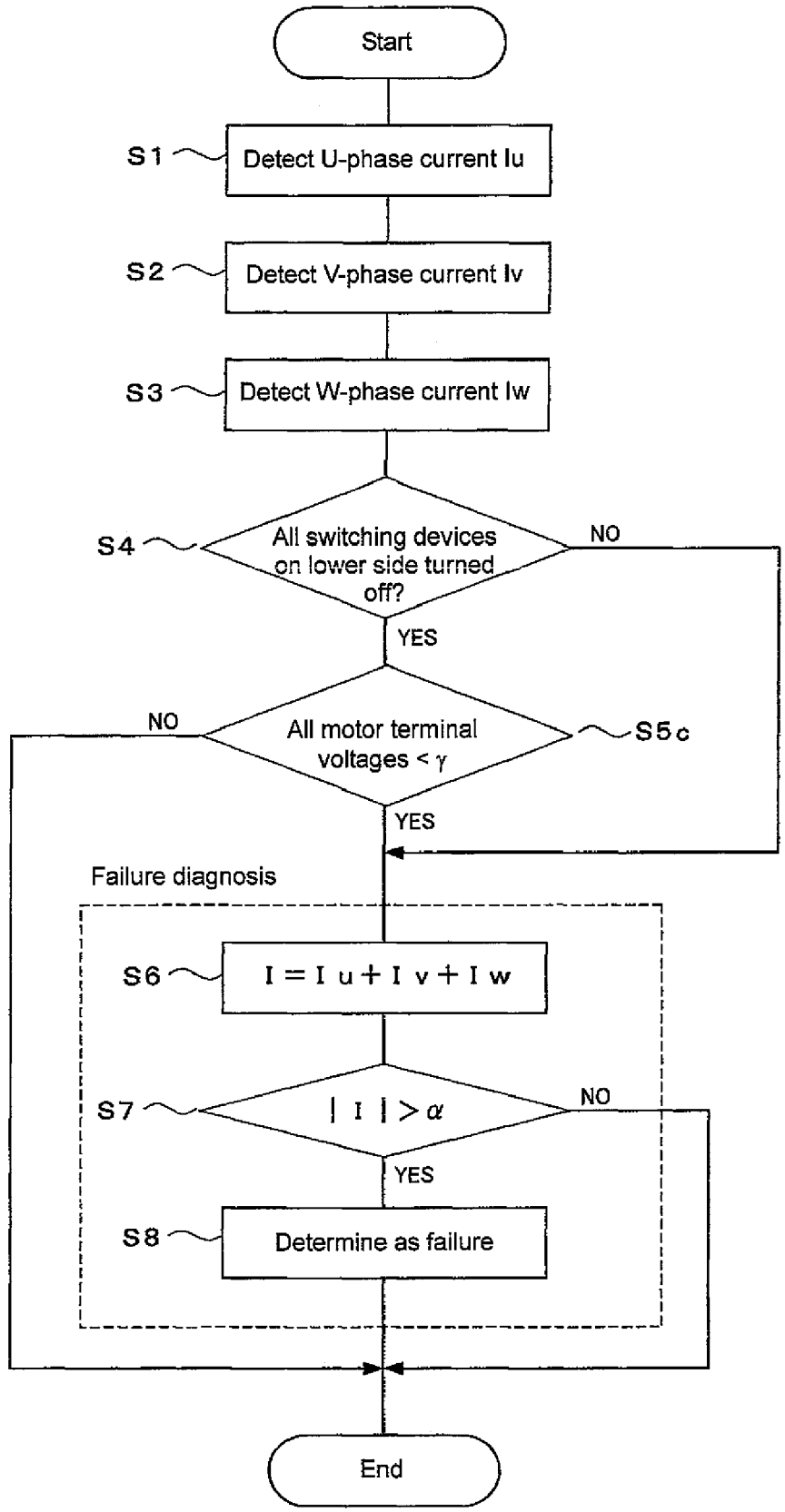
FIG. 6 shows a flowchart of a procedure of a failure diagnosis according to the third embodiment.

The procedure of the failure diagnosis in the circuit of FIG. 5 will now be described based on the flowchart shown in FIG. 6. In FIG. 6, the same reference numerals are denoted for steps performing the same process as in FIG. 2.

Steps S1 to S4 are exactly the same as FIG. 2. In other words, the U-phase current Iu flowing through the current detection resistance Ru is detected in step S1, the V-phase current Iv flowing through the current detection resistance Rv is detected in step S2, and the W-phase current Iw flowing through the current detection resistance Rw is detected in step S3.

Thereafter, the process proceeds to step S4, and whether or not all the switching devices Q2, Q4, and Q6 on the lower side in the inverter circuit 3 are turned OFF is determined. If all the switching devices Q2, Q4, and Q6 on the lower side are not in the OFF state as a result of the determination in step S4 (step S4; NO), the process proceeds to the failure diagnosis process of steps S6 to S8 described above. If all the switching devices Q2, Q4, and Q6 on the lower side are turned OFF (step S4: YES), the process proceeds to step S5c.

In step S5c, the terminal voltages V1, V2, and V3 of the motor 4 detected by the voltage detecting circuit 8 are compared with a predetermined value γ. If all the terminal voltages V1, V2, and V3 do not exceed the predetermined value γ (step S5c: YES), the failure diagnosis process of steps S6 to S8 is performed.

If one of (or all of) the terminal voltages V1, V2, and V3 is greater than or equal to the predetermined value γ (step S5c: NO) as a result of the determination in step S5c, the process is terminated without executing the failure diagnosis process of steps S6 to S8. This aspect is the characteristic of the third embodiment, and erroneous determination on the occurrence of failure can be avoided.

In other words, in a state all the switching devices Q2, Q4, and Q6 on the lower side are turned OFF, there is no possibility that induction voltage generates in the motor 4 due to external force, and thus there is no possibility that currents flow to the current detection resistances Ru, Rv, and Rw if all the terminal voltages V1, V2, and V3 of the motor 4 are smaller than the predetermined value, but there is a possibility that induction voltage generates in the motor 4, and the currents flow to the current detection resistances Ru, Rv, and Rw if one of (or all of) the terminal voltages V1, V2, and V3 of the motor 4 is greater than or equal to the predetermined value. Therefore, if the failure diagnosis process is performed in the latter case, the sum Iu+Iv+Iw of the current values of the respective phases does not become zero, as described with FIG. 9, and erroneous determination that failure has occurred might be made. The failure diagnosis based on the current values is not performed even if the currents flow to the current detection resistances Ru, Rv, and Rw if the failure diagnosis process is prohibited when the terminal voltages of the motor 4 are greater than or equal to the predetermined value, as described above, and thus erroneous determination that failure has occurred is not made, and the reliability of the device can be enhanced.

Figure 7:
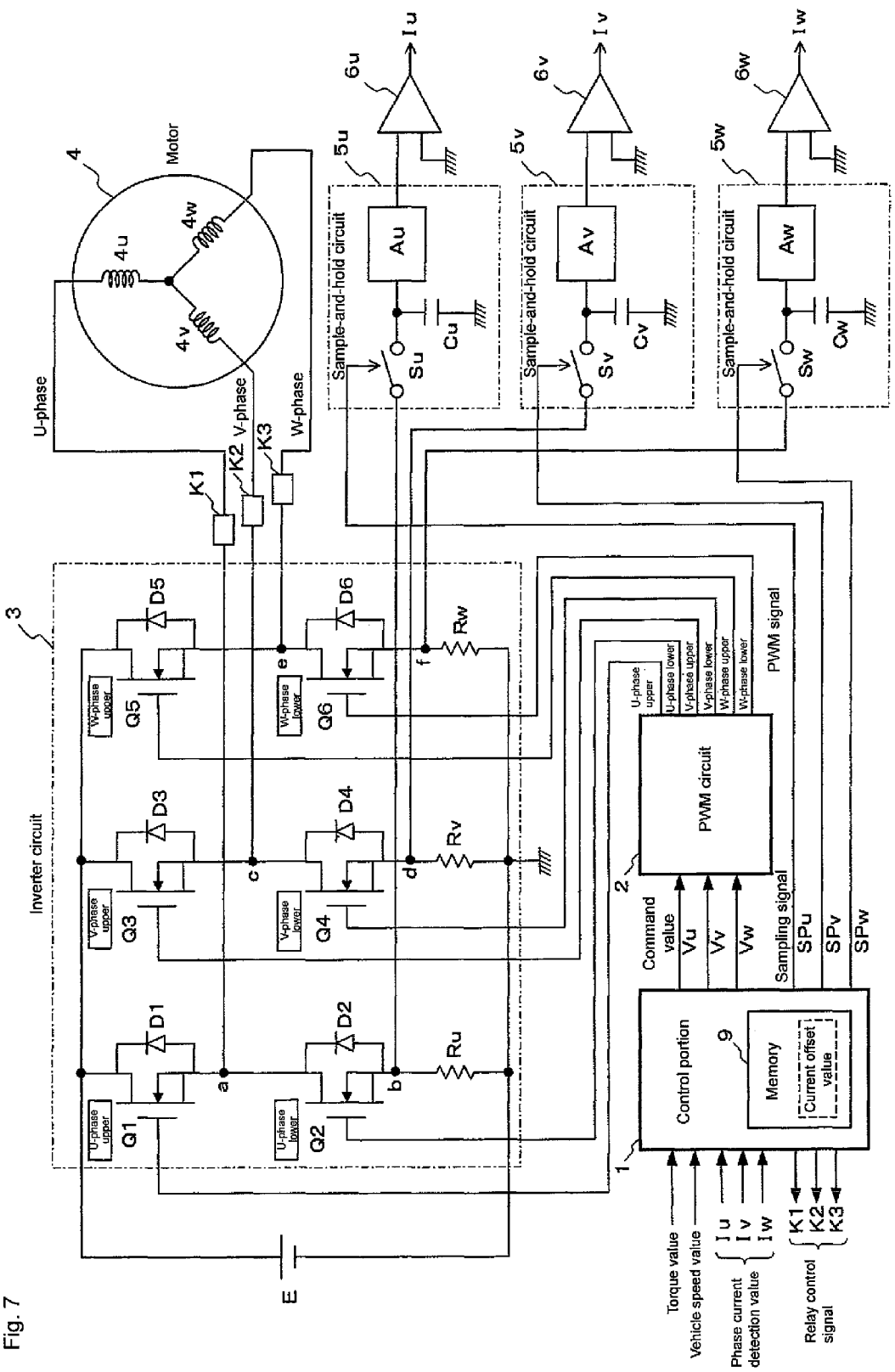
FIG. 7 shows a view of an electrical structure of a multiphase AC motor according to a fourth embodiment of the present invention.

FIG. 7 is a view showing an electrical structure of a multiphase AC motor driving device according to a fourth embodiment of the present invention. In FIG. 7, the same reference numerals are denoted for the same portions as in FIG. 1. In the fourth embodiment, a current offset value to be hereinafter described is stored in a memory 9 arranged in the control portion 1. The memory 9 configures one embodiment of a storage section in the present invention, and the control portion 1 configures one embodiment of a determining section in the present invention. The rotational position sensor 7 of FIG. 3 is not arranged in FIG. 7, but may be added. The circuit of FIG. 7 is basically the same as FIG. 1 other than the above aspect, and thus the detailed description of each part will be omitted.

Figure 8:
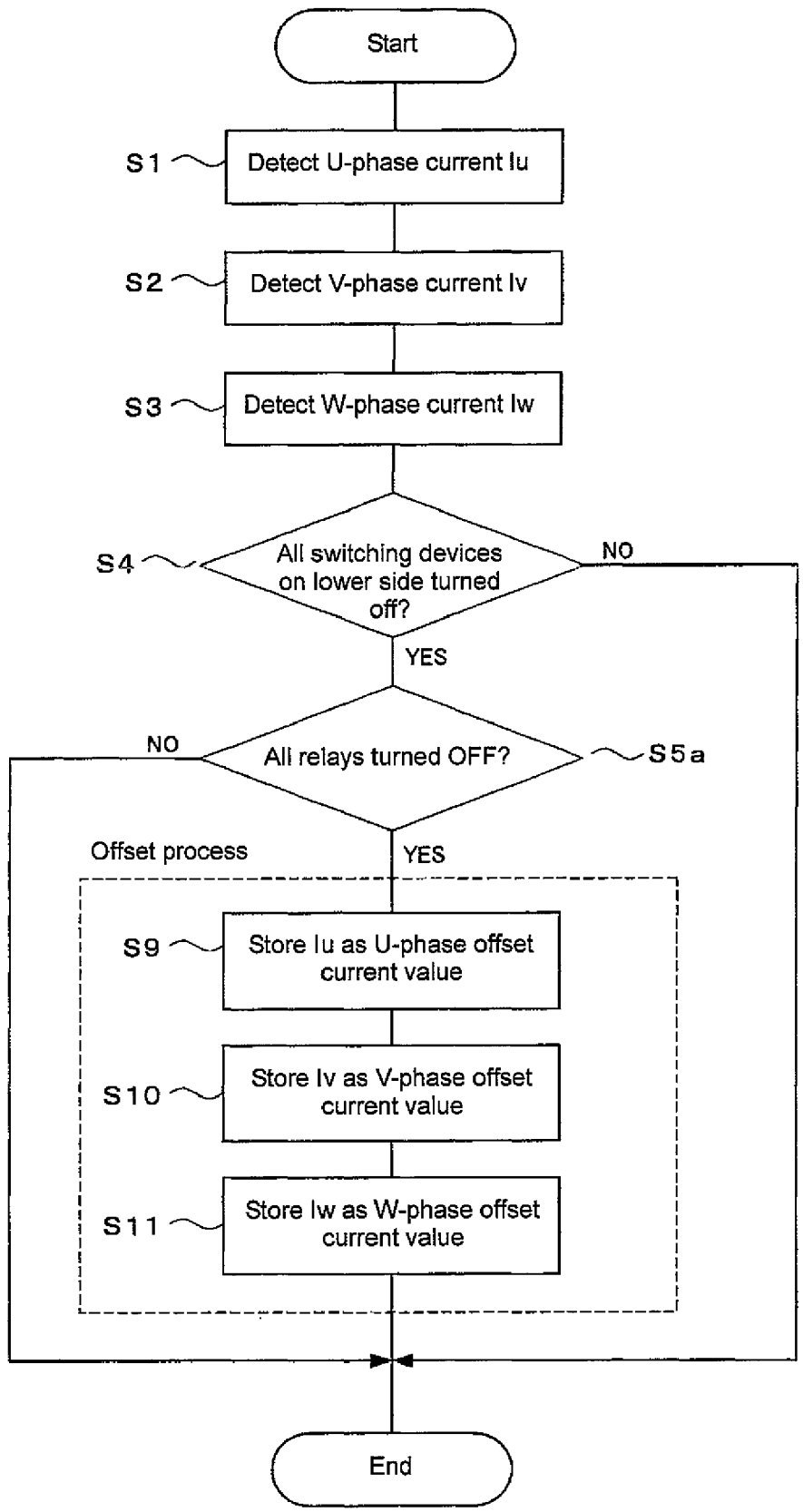
FIG. 8 shows a flowchart of a procedure of an offset process according to the fourth embodiment.

The procedure of an offset process in the circuit of FIG. 7 will be described based on the flowchart shown in FIG. 8. In FIG. 8, the same reference numerals are denoted for steps performing the same process as in FIG. 2.

Steps S1 to S4 are exactly the same as FIG. 2. In other words, the U-phase current Iu flowing through the current detection resistance Ru is detected in step S1, the V-phase current Iv flowing through the current detection resistance Rv is detected in step S2, and the W-phase current Iw flowing through the current detection resistance Rw is detected in step S3.

Thereafter, the process proceeds to step S4, and whether or not all the switching devices Q2, Q4, and Q6 on the lower side in the inverter circuit 3 are turned OFF is determined. If all the switching devices Q2, Q4, and Q6 on the lower side are not in the OFF state as a result of the determination (step S4; NO), the process is terminated without executing the subsequent processes.

If all the switching devices Q2, Q4, and Q6 on the lower side are turned OFF as a result of the determination in step S4 (step S4: YES), the process proceeds to step S5a, and whether or not all the relays K1, K2, and k3 are turned OFF is determined. The ON/OFF state of the relays K1, K2, and K3 can be judged by checking what relay control signal is being output from the control portion 1 by the control portion 1 itself, as described above. If all the relays K1, K2, and K3 are turned OFF (step S5a: YES) as a result of the determination in step S5a, the offset process of storing the offset current value is performed in steps S9 to S11.

The offset current will be described below. If all the relays K1, K2, and K3 are turned OFF (step S5a: YES) when all the switching devices Q2, Q4, and Q6 on the lower side are turned OFF (step S4: YES), the currents should not flow to the current detection resistances Ru, Rv, and Rw under ordinary conditions. Actually, however, slight current sometimes flows to the current detection resistances Ru, Rv, and Rw even under the above situation due to the properties of the analog circuit. This current is called the offset current. During the normal operation of the motor 4, the offset current becomes a factor that causes an error in the detected current values of the current detection resistances Ru, Rv, and Rw. Thus, an accurate phase current can be obtained by measuring and storing the offset currents under a situation where the currents should not flow, and correcting the current values detected in the current detection resistances Ru, Rv, and Rw during the motor operation with the offset current values. Such offset correction is disclosed in Japanese Laid-Open Patent Publication No. 2005-130578 and the like.

In step S9, the value of the U-phase current Iu detected in step S1 is stored in the memory 9 as a U-phase offset current value. In step S10 the value of the V-phase current Iv detected in step S2 is stored in the memory 9 as a V-phase offset current value. In step S11, the value of the W-phase current Iw detected in step S3 is stored in the memory 9 as a W-phase offset current value. The offset current values of the respective phases stored in the memory 9 up to then are updated by the processes of steps S9 to S11.

If all the relays K1, K2, and K3 are not turned OFF as a result of the determination in step S5a (step S5a: NO), the process is terminated without executing the offset process of steps S9 to S11. This aspect is the characteristic of the fourth embodiment, and the offset correction of the detected currents can be accurately performed and erroneous determination on the occurrence of failure can be avoided.

In other words, in a state all the switching devices Q2, Q4, and Q6 on the lower side are turned OFF, even when induction voltage is generated in the motor 4 due to external force, there is no possibility that currents flow to the current detection resistances Ru, Rv, and Rw based on the relevant voltage if the relays K1, K2, and K3 are turned OFF, but there is a possibility that currents flow to the current detection resistances Ru, Rv, and Rw through the relays K1, K2, and K3 when the induction voltage is generated in the motor 4 due to external force, if the relays K1, K2, and K3 are turned ON. However, the currents flowing at this point are based on the induction voltage of the motor 4 and are not the original offset currents, and thus if the process of storing the offset currents is performed in this case, wrong current values are stored in the memory 9 as offset current values, and the offset correction of the detected currents is not be performed accurately. As a result, an error might occur in the determination of the occurrence of failure based on the detected currents. The wrong offset current values are not stored in the memory 9 if the process of storing the offset currents is prohibited when the relays K1, K2, and K3 are turned ON, as described above, and thus the offset correction can be accurately performed, and erroneous determination on the occurrence of failure can be avoided.

In FIG. 8, an example of replacing the steps S6 to S8 of FIG. 2 with the steps S9 to S11 has been described, but the steps S6 to S8 of FIGS. 4 and 6 may be replaced with the steps S9 to S11. Furthermore, the failure diagnosis process is omitted in FIG. 8, but the failure diagnosis may be performed based on the offset corrected phase current after executing steps S9 to S11.

In the embodiments described above, a brushless motor has been described for the motor 4 by way of example, but the present invention is applicable to motor driving devices in general for driving an AC motor with a plurality of phases such as an induction motor and a synchronous motor.

An example of applying the present invention to an electric power steering device of a vehicle has been described in the above embodiments, but the present invention is also applicable to devices for driving a door opening/closing motor, and the like.

What is claimed is:

1. A multi-phase AC motor driving device comprising:
   an inverter circuit including pairs of upper and lower arms provided in association with respective phases of a motor, the inverter circuit being constituted such that the respective arm has a switching device for driving a multi-phase AC motor and a reflux diode connected in parallel to the device, and a voltage for driving the motor is extracted from a connection point of the upper and lower arms of the respective phases;
   a current detecting section, arranged in the lower arm of the respective phase of the inverter circuit, for detecting a phase current of the motor;
   a control section for controlling ON/OFF operation of each switching device of the inverter circuit; and
   a first determining section for determining occurrence of a failure based on a current value detected by the current detecting section; the multi-phase AC motor driving device further comprising:
   a second determining section for determining whether or not there is a possibility that current flows through the current detecting section due to an induction voltage generated in the multi-phase AC motor; wherein
   the first determining section does not make a determination on the occurrence of the failure when the second determining section determines that there is a possibility that current flows and when all the switching devices of the lower arms of the respective phases are turned OFF; and
   the first determining section makes a determination on the occurrence of the failure when the second determining section determines that there is no possibility that current flows and when all the switching devices of the lower arms of the respective phases are turned OFF.

2. The multi-phase AC motor driving device according to claim 1, wherein the second determining section includes an open/close switch connected between the inverter circuit and the multi-phase AC motor, and determines that there is a possibility that current flows through the current detecting section when the open/close switch is turned ON.

3. The multi-phase AC motor driving device according to claim 1, wherein the second determining section includes a rotation speed detecting section for detecting a rotation speed of the multi-phase AC motor, and determines that there is a possibility that current flows through the current detecting section when the rotation speed detecting section detects a rotation speed of greater than or equal to a predetermined value.

4. The multi-phase AC motor driving device according to claim 1, wherein the second determining section includes a terminal voltage detecting section for detecting a terminal voltage of the multi-phase AC motor, and determines that there is a possibility that current flows through the current detecting section when the terminal voltage detecting section detects a terminal voltage of greater than or equal to a predetermined value.

5. The multi-phase AC motor driving device according to claim 1, wherein the first determining section makes the determination on the occurrence of the failure based on whether or not a sum of the current values of the respective phases detected by the current detecting section is zero.

6. A multi-phase AC motor driving device comprising:
an inverter circuit including pairs of upper and lower arms provided in association with respective phases of a motor, the inverter circuit being constituted such that the respective arm has a switching device for driving a multi-phase AC motor and a reflux diode connected in parallel to the device, and a voltage for driving the motor is extracted from a connection point of the upper and lower arms of the respective phases;
a current detecting section, arranged in the lower arm of the respective phases of the inverter circuit, for detecting a phase current of the motor;
a control section for controlling ON/OFF operation of each switching device of the inverter circuit; and
a storage section for storing current values of offset currents of the respective phases flowing through the current detecting section; the multi-phase AC motor driving device further comprising;
a determining section for determining whether or not there is a possibility that current flows through the current detecting section due to an induction voltage generated in the multi-phase AC motor; wherein
the offset current value is not stored in the storage section when the determining section determines that there is a possibility that current flows and when all the switching devices of the lower arms of the respective phases are turned OFF; and
the offset current values are stored in the storage section when the determining section determines that there is no possibility that current flows and when all the switching devices of the lower arms of the respective phases are turned OFF.

* * * * *